United States Patent
Ring et al.

(10) Patent No.: US 7,359,122 B2
(45) Date of Patent: Apr. 15, 2008

(54) PRISM ASSEMBLY

(75) Inventors: James W. Ring, Blodgett, OR (US);
Brett Dahlgren, Lebanon, OR (US);
Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 11/149,739

(22) Filed: Jun. 9, 2005

(65) Prior Publication Data

US 2006/0279846 A1    Dec. 14, 2006

(51) Int. Cl.
  *G02B 27/14* (2006.01)
(52) U.S. Cl. .................... 359/634; 359/291; 359/638
(58) Field of Classification Search ........ 359/629–639, 359/81, 33, 82; 358/55
  See application file for complete search history.

(56) References Cited

U.S. PATENT DOCUMENTS

| | | | |
|---|---|---|---|
| 3,905,684 A * | 9/1975 | Cook et al. | 359/633 |
| 3,932,027 A | 1/1976 | Cook et al. | |
| 4,857,997 A * | 8/1989 | Fukami et al. | 348/338 |
| 5,754,260 A | 5/1998 | Ooi et al. | |
| 5,777,674 A | 7/1998 | Ohmuro et al. | |
| 5,786,934 A * | 7/1998 | Chiu et al. | 359/494 |
| 5,986,815 A * | 11/1999 | Bryars | 359/634 |
| 6,340,230 B1 * | 1/2002 | Bryars et al. | 353/31 |
| 6,561,652 B1 | 5/2003 | Kwok et al. | |
| 6,583,921 B2 * | 6/2003 | Nelson | 359/291 |
| 6,623,125 B2 | 9/2003 | Chen et al. | |
| 6,644,813 B1 | 11/2003 | Bowron | |
| 6,788,469 B2 * | 9/2004 | Dewald et al. | 359/634 |
| 6,793,344 B2 | 9/2004 | Kwok et al. | |
| 7,118,225 B2 * | 10/2006 | Penn | 353/84 |
| 2002/0196413 A1 | 12/2002 | Kwok et al. | |
| 2003/0063388 A1 | 4/2003 | Berman et al. | |
| 2006/0098284 A1 * | 5/2006 | Aastuen et al. | 359/487 |
| 2006/0158620 A1 * | 7/2006 | Lerner et al. | 353/102 |

* cited by examiner

*Primary Examiner*—Scott J. Sugarman
*Assistant Examiner*—Vipin M Patel

(57) ABSTRACT

A prism assembly includes a first prism having a first front face, a first side face, and a first rear face, a second prism having a second front face parallel to the first rear face, a second side face, and a second rear face. The second prism is configured to direct a first component beam through the second side face. The prism assembly also includes a third prism having a third front face parallel to the second rear face, a third side face, and a third rear face. The third prism is configured to direct a second component beam through the third side face. The prism assembly also includes a fourth prism having a fourth front face parallel to the third rear face and a fourth rear face, the rear face being parallel to the first front face. The fourth rear face is configured to transmit a third component beam there through.

28 Claims, 5 Drawing Sheets

PRISM ASSEMBLY

BACKGROUND

Display systems display an image or series of images on a display surface. In particular, each image is frequently made up of several sub-images. For example, some systems produce a red, a green, and a blue sub-image that are then combined to form a single, full-color image.

Several display systems include a light source module that produces light. The light produced by the light source module is directed to a prism. The prism splits the light into component colors. For example, a tri-color prism may split the color into red, green, and blue light rays. The light directed to each of the modulator panels is then modulated to form the sub-images, as introduced.

The prisms used to form the device are frequently expensive. Further, the prisms frequently occupy a relatively large space, thereby increasing the overall size of the display system.

SUMMARY

A prism assembly includes a first prism having a first front face, a first side face, and a first rear face, a second prism having a second front face parallel to the first rear face, a second side face, and a second rear face. The second prism is configured to direct a first component beam through the second side face. The prism assembly also includes a third prism having a third front face parallel to the second rear face, a third side face, and a third rear face. The third prism is configured to direct a second component beam through the third side face. The prism assembly also includes a fourth prism having a fourth front face parallel to the third rear face and a fourth rear face, the rear face being parallel to the first front face. The fourth rear face is configured to transmit a third component beam there through

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A prism assembly is provided herein for use in a display system, such as televisions or projectors. The prism assembly splits multi-component light into component beams. For example, according to several exemplary embodiments discussed below, component prisms of the prism assembly internally reflect a component beam and direct that component beam to associated modulator panels.

The component beams are then modulated by each of the modulator panels to form individual sub-images. The images are then recombined to form full-color images that are focused onto a display surface by display optics. The use of the prism assembly for splitting and directing the light to each modulator panel may decrease the complexity and expense of the light modulator panel assembly, as well as decrease the overall size of such assemblies. An exemplary display system will first be discussed, followed by an exemplary prism assembly, an on-axis projection assembly, an off-axis projection assembly, and a method of forming a prism assembly.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
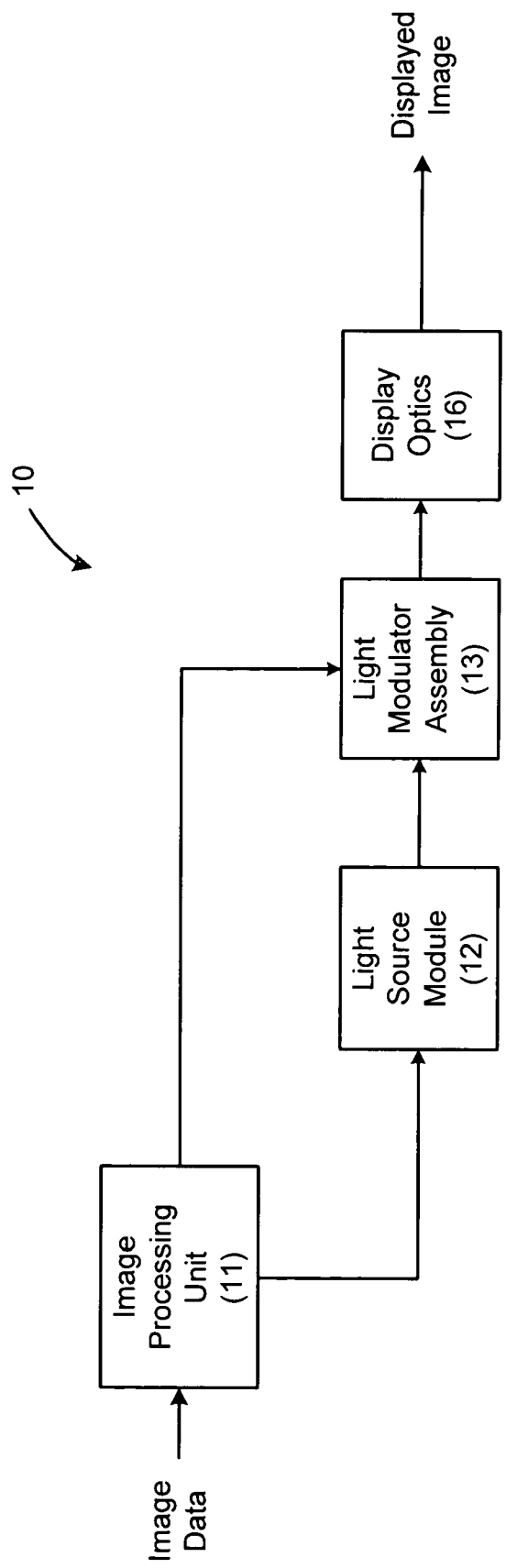
FIG. 1 illustrates a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10).

While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a light modulator assembly (13).

The light source module (12) includes a lamp assembly, which may include a burner coupled to a reflector. The light source module (12) may also include an integrator that homogenizes the light produced by the lamp assembly and directs it from the light source module (12) to the light modulator assembly (13).

The incident light is split into individual components, such as red, green, and blue components. These components are then directed to corresponding modulator panels. The incident light may be modulated in its phase, intensity, polarization, or direction by the modulator panels. The light modulator assembly (13) includes a plurality of individual light modulator panels.

For example, according to one exemplary embodiment, the light modulator assembly (13) includes a prism assembly that splits the white light directed to the light modulator assembly (13) from the light source module (12) into component beams and direct component beams, such as a red beam, a blue beam, and a green beam, to corresponding light modulator panels. The light modulator panels modulate the light and direct the modulated light back to the prism assembly. The modulated light is then directed from the prism assembly to the display optics (16).

The display optics (16) may include any device configured to display or project an image. For example, the display optics (16) may be, but are not limited to, a lens configured to project and focus an image onto a viewing surface. The viewing surface may be, but is not limited to, a screen, a television such as a rear projection-type television, wall, liquid crystal display (LCD), or computer monitor. An exemplary method of modulating light in a light modulator assembly will now be discussed.

Light Modulator Assembly

Figure 2:
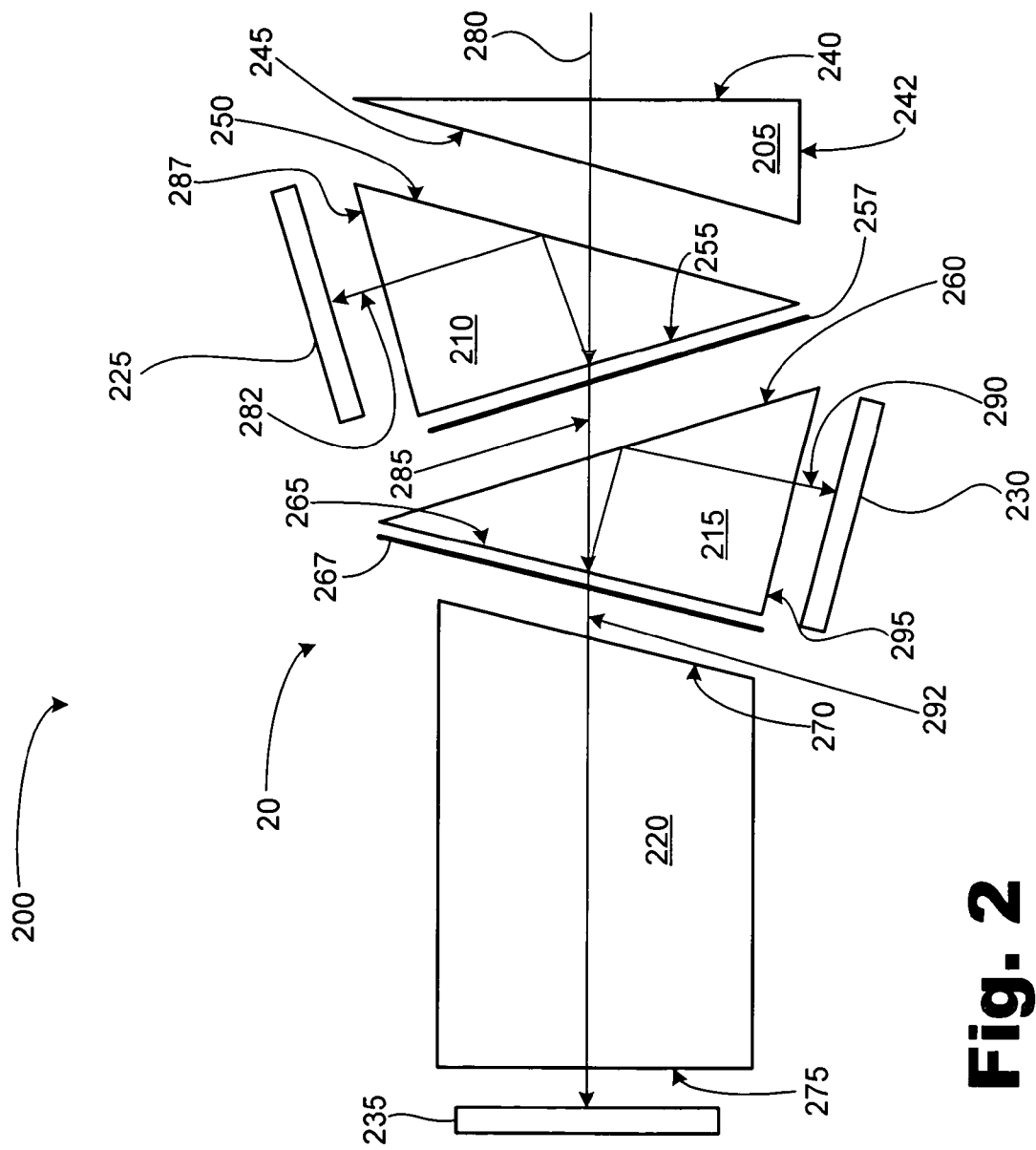
FIG. 2 illustrates a light modulator assembly that includes a prism assembly according to one exemplary embodiment.

FIG. 2 illustrates an exploded side view of a light modulator assembly (20) that includes a prism assembly (200) according to one exemplary embodiment. As shown in FIG. 2, the prism assembly (200) includes first, second, third, and fourth prisms (205, 210, 215, 220) and three modulator panels. The prisms may be formed of any suitable transparent or semi-transparent material, such as glass. According to one exemplary embodiment, the three modulator panels include a green modulator panel (225), a blue modulator panel (230), and a red modulator panel (235). Suitable modulator panels include, without limitation, reflective, interference and LCD type modulator panels.

Each of the prisms (205, 210, 215, 220) has a front face and a rear face. These faces include the first front and rear faces (240, 245) of the first prism (205), second front and rear faces (250, 255) of the second prism (210), third front and rear faces (260, 265) of the third prism (215), and the fourth front and rear faces (270, 275) of the fourth prism (220). These faces interact to split white light into component beams and to direct each of the component beams to a corresponding modulator panel.

Multi-component light, generally referred to as white light (280), is directed to the prism assembly (200) from a light source module (12; FIG. 1), where it is incident on the first front face (240). In particular, the white light (280) is substantially normal to the first front face (240). The amount of light incident on a prism that enters the prism depends, at least in part, on the angle of incidence.

The angle of incidence refers to the angle between the path of the light as it is incident on the surface and a line normal to the surface. The smaller the angle of incidence, the larger the percentage of incident light that will enter the prism. Accordingly, substantially all of the white light (280), which is substantially normal to the first front face (240) and thus has an angle of incident of about zero, enters the first front face (240).

The white light (280) then passes through the first prism (205), which also includes a first side face (242), where it is incident on the first rear face (245). According to the present exemplary embodiment, at this interface, the white light (280) has an angle of incidence of approximately 30 degrees. A substantial portion of the white light (280) is transmitted through the second prism (210). In particular, the white light (280) is transmitted through the second front face (250) and through the second prism (210) where it is incident on the second rear face (255). The second prism may have internal angles of approximately 40, 50, and 90 degrees. The white light (280) has an angle of incidence of approximately 10 degrees on the second rear face (255). A first dichroic layer (257) is deposited on the second rear face (255). For ease of reference, the first dichroic layer (257) is shown separated from the rear face (255). According to one exemplary embodiment, the first dichroic layer (257) is configured to reflect green light (282) and to transmit red/blue light (285).

The relatively small internal angles increase the efficiency of the prism by providing a relatively high percentage of light to the modulator panel. The reflected green light (282) is directed to the second front face (250) where it has an angle of incidence that is greater than approximately 41.182 degrees. This angle may be sufficiently large that the green light (282) is completely internally reflected. In particular, the green light (282) is incident on the second front face (250) with an angle of incidence of approximately 50 degrees. As a result, the green light (282) is substantially completely reflected. The green light (282) is directed to a second side face (287) of the second prism (210). The green light (282) may be substantially normal to the second side face (287), such that substantially all of the green light (282) is transmitted through the second side face (287) and to the green modulator panel (225). Accordingly, the green light (282) is separated and directed from the second prism (210) to the green modulator panel (225) while the red/blue light (285) is transmitted to the third prism (215).

In particular, red/blue light (285) is transmitted from the second rear face (255), through the first dichroic surface, which is configured to reflect green light (282) and transmit red/blue light (285) to the third front face (260). Thereafter, the red/blue light (285) is incident on the rear face (265) of the third prism (215) with an angle of incidence of approximately 20 degrees. The third prism (215) according to one exemplary embodiment has internal angles of approximately 30, 50, and 100 degrees. The relatively small angles opposite the third side face (295) and the third rear face (265) provide for relatively high transmission of light to the blue modulator panel (230).

A second dichroic layer (267) is formed on the third rear face (265). According to the present exemplary embodiment, the second dichroic layer (267) on the third rear face (265) is configured to reflect blue light (290) and transmit red light (292). The reflected blue light (290) is directed to the third front face (260). The blue light (290) has an angle of incidence of approximately 50 degrees with respect to the third front face (260). This angle is sufficient such that substantially all the blue light (290) is internally reflected and directed to the third side face (295). The incident blue light (290) is substantially normal to the third side face (295), such that substantially all of the blue light (290) is transmitted to the blue modulator panel (230).

The red light (292) that is transmitted through the second dichroic layer is directed to the fourth front face (270). The red light (292) travels through the fourth prism (220) to where it is incident on the fourth rear face (275). In particular, the red light (292) is substantially normal to the fourth rear face (275) such that substantially all the red light (292) is transmitted through the fourth rear face (275) to the red modulator panel (235).

The green, blue, and red light (282, 290, 292) directed to the green, blue, and red modulator panels (225, 230, 235) respectively is modulated to form individual sub-images. The green, blue, and red light discussed above with reference to corresponding modulator panels is for ease of reference only. Those of skill in the art will appreciate that any combinations of colors and corresponding modulator panels may be selected. Returning to the present exemplary embodiment, the green light (282) directed to the green modulator panel (225) is modulated to form the green portion of a full-color picture, or green blue sub-image. These sub-images are then directed through the prism assembly (200), as will be discussed in more detail below.

On-Axis Projection Assembly

Figure 3:
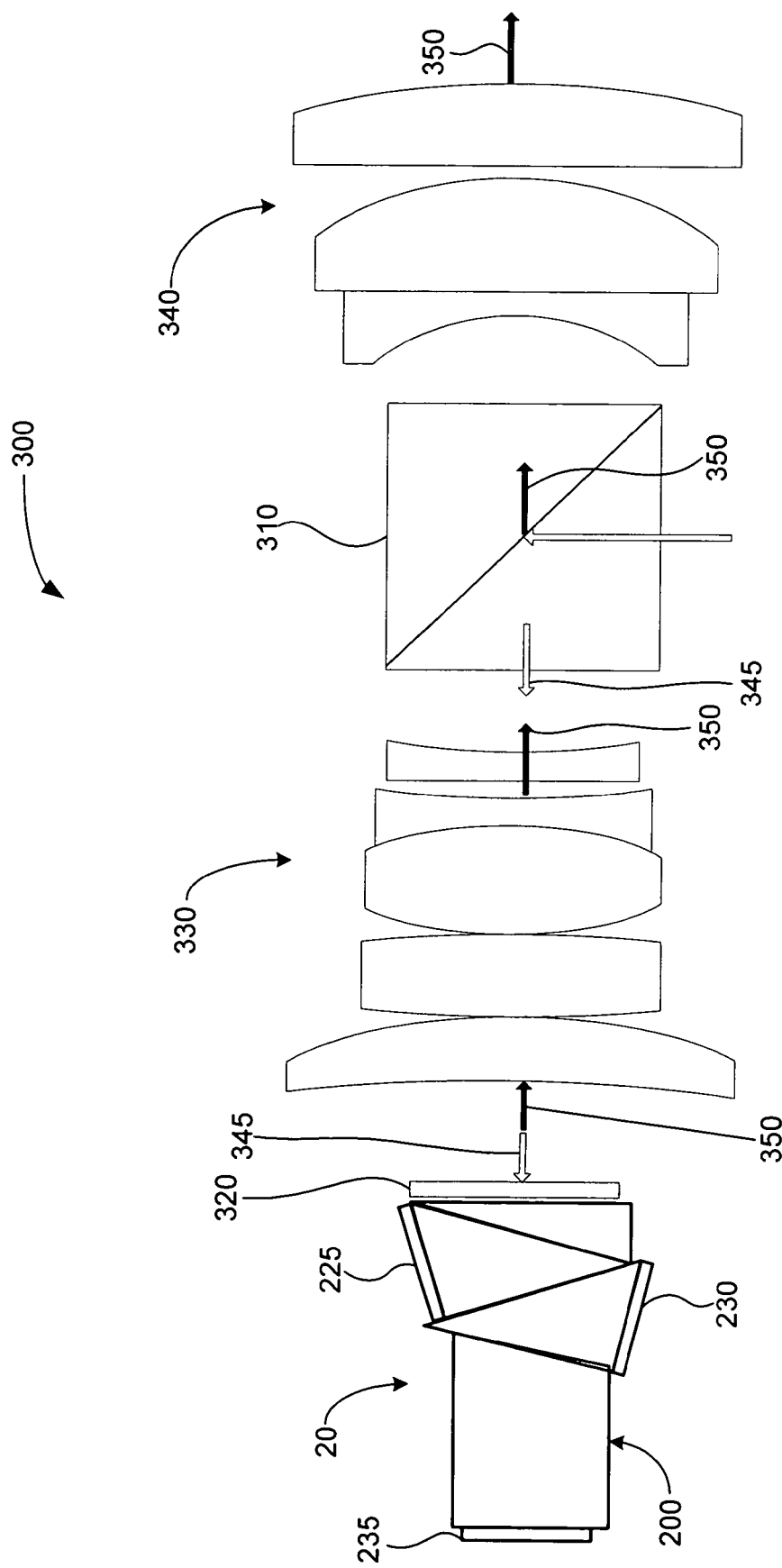
FIG. 3 illustrates an on-axis projection assembly according to one exemplary embodiment.

FIG. 3 illustrates a projection assembly (300) that includes a prism assembly (200; FIG. 2) according to one exemplary embodiment. The projection assembly (300) also includes a polarized beam splitter (PBS) (310), a ¼ wave plate (320), a coupling lens assembly (330), and a display optics assembly (340).

As seen in FIG. 3, light, such as linearly polarized white light (345) is directed to the PBS (310). For ease of reference, linearly polarized white light with an initial polarization an orientation will be described, though other configurations are possible. The PBS (310) is configured to reflect linearly polarized white light (345) with an initial polarization that is directed thereto toward the light modulator panel assembly (20).

In particular, as the polarized white light (345) is directed toward the light modulator assembly (20), it passes through the coupling lens assembly (330) and the ¼ wave plate (320).

The coupling lens assembly (330) focuses the polarized light (345) through the ¼ wave plate (320) and into the light modulator assembly (20). While the ¼ wave plate (320) shown in located between the coupling lens assembly (330) and the prism assembly (200), those of skill in the art will appreciate that the ¼ wave plate may be located else where. For example, the ¼ wave plate may be located between the PBS (310) and the coupling lens assembly (330). Further, ¼ wave plates may be located between the prism assembly and each of the modulator panels.

The ¼ wave plate (320) changes the polarization of the initially linearly polarized light to circularly polarized and rotates the orientation 45 degrees. After the circular polarized white light (345) is passed initially through the ¼ wave plate (320), the circular polarized white light (345) is directed into the prism assembly (200). The prism assembly (200) splits the circular polarized white light (345) and directs the component beams onto the red, green, and blue modulator panels (225, 230, 235). Each modulator panel then modulates the circularly polarized light (345) to form modulated component beams.

The modulated component beams are then returned along substantially the same paths as taken to the modulator panels. This modulated light exits the prism assembly (200) and passes through the ¼ wave plate (320). As the modulated light (350), which may be have circular polarization and be rotated 45 degrees, passes through the ¼ wave plate (320), the polarization of modulated light is switched to linear polarization and rotated another 45 degrees, such that the modulated light (350) exiting the ¼ wave plate (320) has a polarization that is orthogonal to that of the initial linearly polarized white light (345).

The modulated light (350), with an orientation rotated 90 degrees from the initial linearly polarized white light (345) is then directed to the coupling lens assembly (330). According to the present exemplary embodiment, the modulated light (350) follows substantially the same path from each of the modulator panels (225, 230, 235) through the prism assembly (200) and the coupling lens assembly (330).

This modulated light is then directed to the PBS (310). As previously discussed, the PBS (310) is configured to reflect light having the initial liner polarization provided byte light source module (12, FIG. 1). In addition, the PBS (310) is configured to transmit orthogonally polarized light. Thus, the orthogonal orientation of the modulated light beam (350) allows it to be transmitted through PBS (310). The PBS (310) passes the modulated light to the display optics assembly (340). The display optics assembly (340) directs the modulated light onto a display surface to form a full-color image thereon.

Off-Axis Projection Assembly

Figure 4:
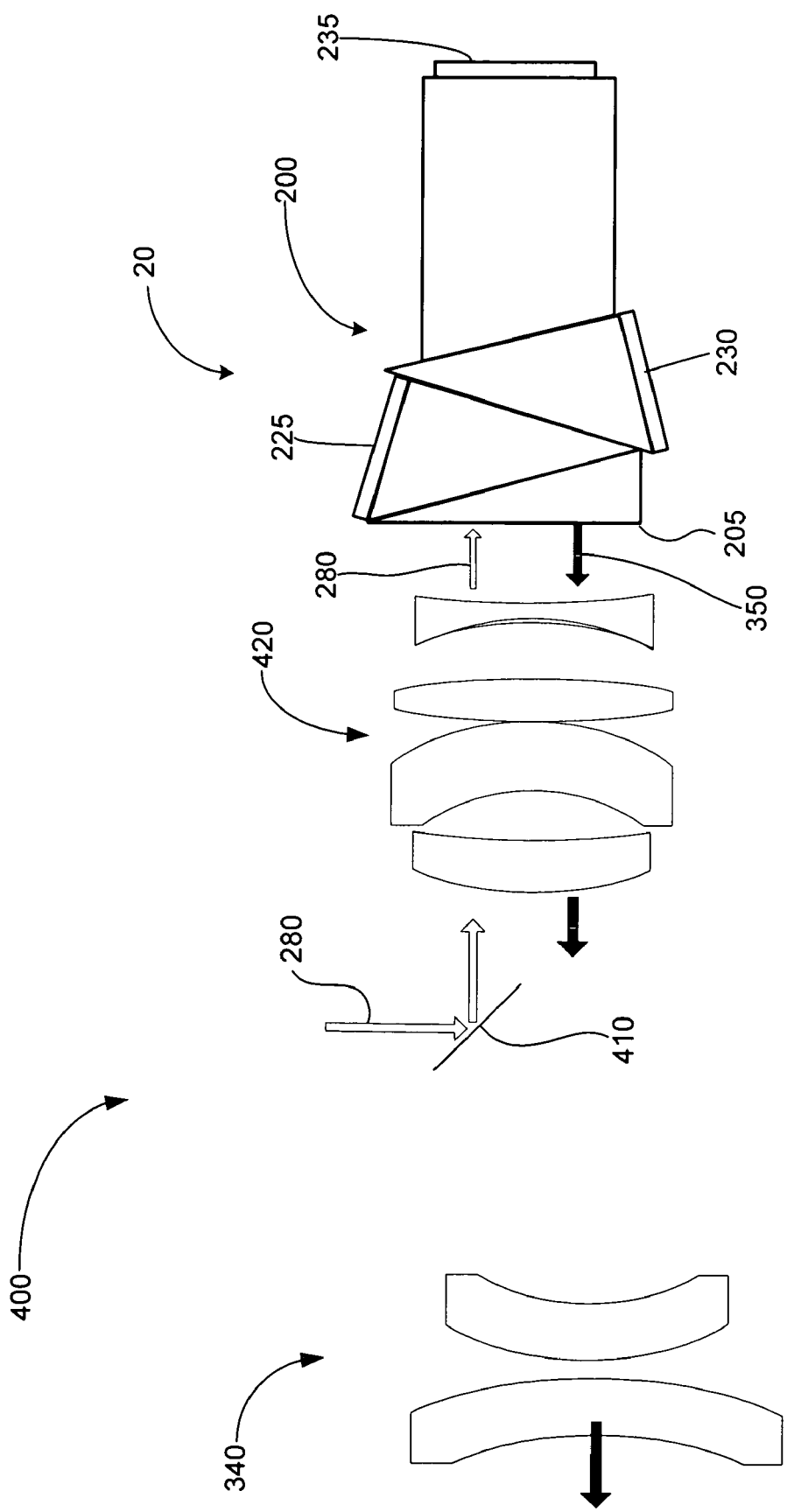
FIG. 4 illustrates an off-axis projection assembly according to one exemplary embodiment.

FIG. 4 illustrates an off-axis projection assembly (400). The projection assembly (400) includes a turning mirror (410), a coupling lens assembly (420), a light modulator assembly (20) including a prism assembly (200), and a display optics assembly (340). White light (280) from a light source module (12; FIG. 1) is directed to the turning mirror (410).

The turning mirror (410) is located at the optical pupil of the projection assembly (400). This location of the turning mirror (410) may simultaneously minimize the size of the turning mirror (410) and the angle of the off-axis illumination. The turning mirror (410) directs the white light (280) to the coupling lens assembly (420).

The coupling lens assembly (420) focuses the illumination to the light modulator assembly (20). In particular, according to one exemplary embodiment shown in FIG. 4, the white light (280) is directed to the prism assembly (200) through a first path through the coupling lens assembly (420). The prism assembly (200) splits the white light (280) into green, blue, and red components, and directs the components to the green, blue, and red modulator panels (225, 230, 235) as previously discussed.

Each component color is modulated by the green, blue, and red modulator panels (225, 230, 235) to form individual sub-images or modulated components. These individual modulated components are then redirected from the green, blue, and red modulator panels (225, 230, 235) back through the prism assembly (200) to the coupling lens assembly (420).

In particular, according to the present exemplary embodiment, the modulated components travel through a second portion of the coupling lens assembly (420). As a result the white light (280) and modulated component beams are separated. The degree of separation is due, at least in part, to the off-axis angle, which may be approximately 10 degrees. The off-axis angle refers generally to the angle between the path of the white light (280) and the modulated light (350).

As the modulated light (350) travels through the coupling lens assembly (420), the modulated light (350) is then passed to the display optics assembly. (340). The display optics assembly (340) then focuses the modulated light (350) onto a viewing surface to form an image.

Method of Forming a Prism Assembly

Figure 5:
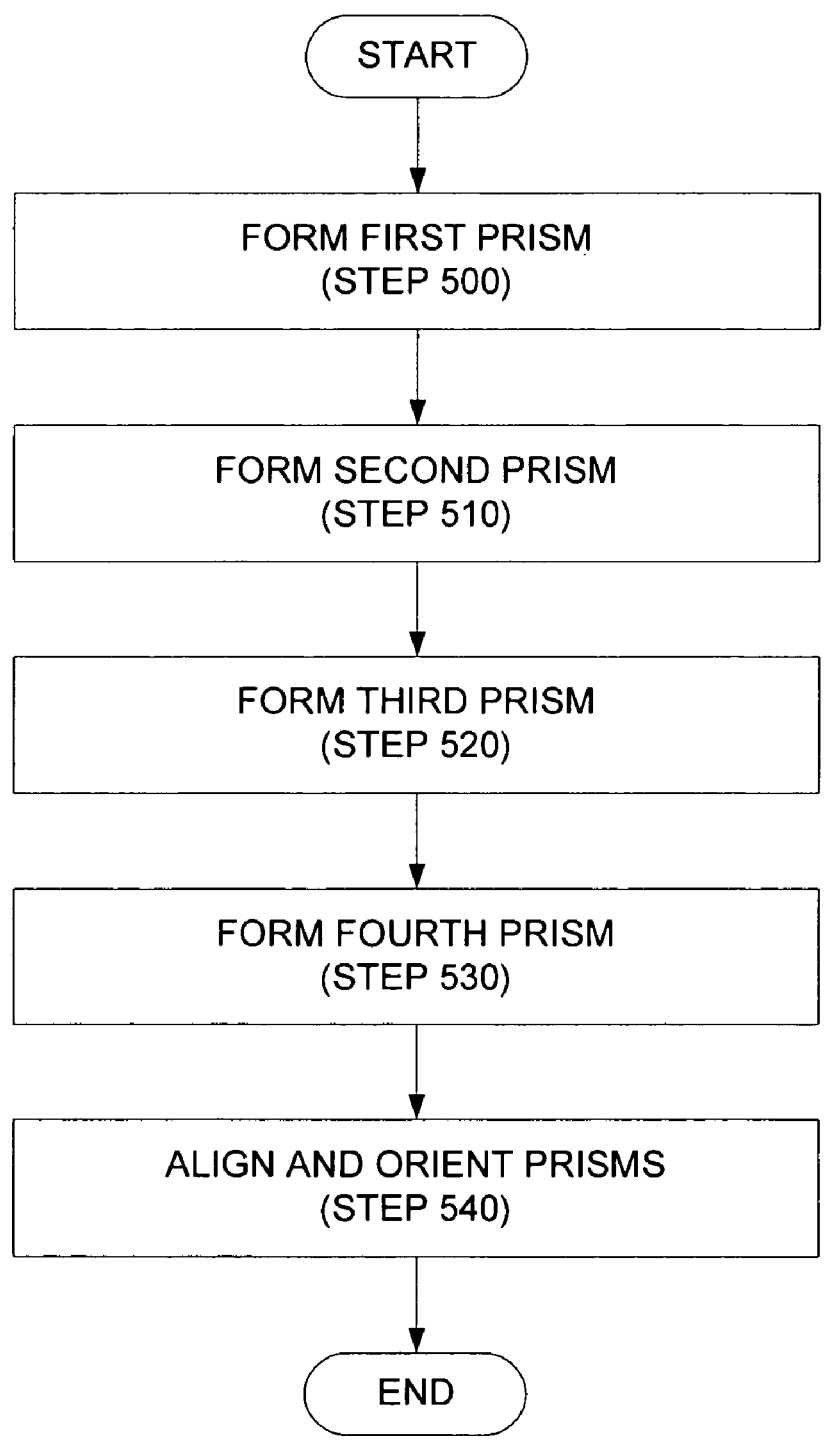
FIG. 5 illustrates a method of forming a light modulator assembly according to one exemplary embodiment.

FIG. 5 is a flowchart illustrating a method of forming a light modulator assembly. The method begins by forming a first prism (step 500). In particular, the first prism may have a triangular cross section. For example, the triangular cross section may have internal angles of approximately 30, 60, and 90 degrees. According to one exemplary embodiment, these angles may be optimized to approximately 30.856 degrees, 59.144 degrees, and 90 degrees for a material with an index of refraction of approximately 1.5187.

A second prism may be formed (step 510). The second prism may also be a triangular prism. The second prism includes a dichroic surface formed on the rear face thereof. According to the present exemplary method, the dichroic surface on the rear face of the dichroic surface is configured to reflect green light and to transmit red and blue light. The shape of the second prism may be optimized such that substantially all of the reflected green light is internally reflected and directed out of the side face.

For example, according to one exemplary method, the internal angles may be optimized to approximately 40 degrees, 50 degrees, and 90 degrees for an index of refraction of approximately 1.5187. The front face of the second prism is configured to be parallel to the rear face of the first prism with the front face corresponding to the largest side of the prism, while the rear face corresponds to the opposing angle of 50 degrees and the side face corresponds to the opposing angle of 40 degrees.

A third prism is then formed (step 520). According to the present exemplary method, the rear face of the third prism has a dichroic surface formed thereon that is configured to reflect blue light and transmit red light. The shape of the third prism may be optimized such that substantially all of the reflected blue light is internally reflected and directed out of the side face.

For example, according to one exemplary method, the internal angles may be optimized to approximately 40 degrees, 50 degrees, and 90 degrees for an index of refraction of approximately 1.5187. The front face of the third prism is configured to be parallel to the rear face of the second prism with the front face corresponding to the largest side of the prism, while the rear face corresponds to the opposing angle of 50 degrees and the side face corresponds to the opposing angle of 40 degrees.

A fourth prism is then formed (step 530). According to the present exemplary method the fourth prism is a trapezoid having two right angles, an oblique angle, and an acute angle. In particular, the front face is configured to be parallel to the rear face of the third prism.

The first, second, third, and fourth prisms are then aligned and oriented about an axis (step 540). According to one exemplary method, the axis is central to the fourth prism. According to such a method, approximately 4.875 mm of the first prism lie on the axis, 4.875 mm of the second prism lie on the axis, and 4.322 mm of the third prism lie on the axis. Accordingly, the thickness of the prism assembly, as measured from the front face of the first prism to the rear face of the fourth prism, may be less than about 30 mm. In addition, such a configuration provides that the distance traveled by each of the component beams is substantially equal. Thus, the present method provides for the formation of a prism assembly that splits multi-component light, and directs some of the components to corresponding light modulator panels through total internal reflection.

A prism assembly is provided herein for use in a display system, such as televisions or projectors. The prism assembly splits multi-component light into component beams. For example, according to several exemplary embodiments discussed below, component prisms of the prism assembly internally reflect a component beam and direct that component beam to associated modulator panels.

The component beams are then modulated by each of the modulator panels to form individual sub-images. The images are then recombined to form full-color images that are focused onto a display surface by display optics. The use of the prism assembly for splitting and directing the light to each modulator panel may decrease the complexity and expense of the light modulator panel assembly as well as decreasing the overall size of such assemblies.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A prism assembly, comprising:
   a first prism having a first front face, a first side face, and a first rear face;
   a second prism having a second front face parallel to said first rear face, a second side face, and a second rear face, said second prism being configured to direct a first component beam through said second side face,
   a third prism having a third front face parallel to said second rear face, a third side face, and a third rear face, said third prism being configured to direct a second component beam through said third side face; and
   a fourth prism having a fourth front face parallel to said third rear face and a fourth rear face, said rear face being parallel to said first front face and being configured to transmit a third component beam there through;
   wherein said prism assembly comprises two independent optical paths including (1) a first path beginning at said first front face and through which incoming light is split and redirected to three different locations by said prisms and (2) a second path in which light from said three different locations is combined and output through said first front face; and
   wherein said first and second optical paths are separated by an optical axis of said prism assembly.

2. The assembly of claim 1, wherein said second prism has a first dichroic surface formed thereon for reflecting a first component beam and transmitting said second and third component beams.

3. The assembly of claim 2, wherein said third prism has a second dichroic surface formed thereon for reflecting said second component beam and transmitting said third component beam.

4. The assembly of claim 3, wherein said first dichroic surface is configured to reflect green light and to transmit red and blue light and said second dichroic surface is configured to reflect blue light and transmit red light.

5. The assembly of claim 1, wherein said second prism is configured to totally internally reflect said first component beam and said third prism is configured to totally internally reflect said second component beam.

6. The assembly of claim 1, wherein said first prism includes internal angles of approximately 30 degrees, 60 degrees, and 90 degrees.

7. The assembly of claim 1, wherein said second prism includes internal angles of approximately 40 degrees, 50 degrees and 90 degrees.

8. The assembly of claim 1, wherein said third prism includes internal angles of approximately 30 degrees, 50 degrees and 100 degrees.

9. The assembly of claim 1, wherein said first, second, third, and fourth prisms are glass.

10. The assembly of claim 1, wherein a distance from said front face of said first prism to said rear face of said fourth prism is less than about 30 mm.

11. A light modulator assembly, comprising:
    a polarized beam splitter for reflecting light of a first polarization into said light modulator assembly;
    a prism assembly including a first prism having a first front face and a first rear face, a second prism having a second front face parallel to said first rear face, a second side face, and a second rear face, said second prism being configured to direct a first component beam through said second side face, a third prism having a third front face parallel to said second rear face, a third side face, and a third rear face, said third prism being configured to direct a second component beam through said third side face, and a fourth prism having a fourth front face parallel to said third rear face and a fourth rear face, said rear face being parallel to said first front face;
    a first modulator panel in optical communication with said second side face;

a second modulator panel in optical communication with said third side face;

a third modulator panel in optical communication with said fourth rear face; and a ¼ wave plate arranged between said polarized beam splitter and said prism assembly such that light passes through said wave plate when entering said prism assembly and again when leaving said prism assembly, such that light leaving said prism assembly is polarized with a second polarization that is orthogonal to said first polarization, wherein said polarized beam splitter is configured to receive and transmit said light leaving said prism assembly with said second polarization;

wherein at least one of said light modulator panels comprises an interference type light modulator panel.

12. The assembly of claim 11, wherein said first modulator panel comprises a green modulator panel, said second modulator panel comprises a blue modulator panel, and said third modulator panel comprises a red modulator panel.

13. The assembly of claim 11, wherein at least one of said light modulator panels comprises a liquid crystal display type light modulator panel.

14. The assembly of claim 11, wherein at least one of said light modulator panels comprises a reflective type light modulator panel.

15. A projection assembly, comprising:
a prism assembly including a first prism having a first front face and a first rear face, a second prism having a second front face parallel to said first rear face, a second side face, and a second rear face, said second prism being configured to direct a first component beam through said second side face, a third prism having a third front face parallel to said second rear face, a third side face, and a third rear face, said second prism being configured to direct a second component beam through said third side face, and a fourth prism having a fourth front face parallel to said third rear face and a fourth rear face, said rear face being parallel to said first front face;

a first modulator panel in optical communication with said second side face;

a second modulator panel in optical communication with said third side face;

a third modulator panel in optical communication with said fourth rear face; and a coupling lens assembly optically coupled to said prism assembly and having an optical axis aligned with an optical axis of said prism assembly; and a directing member configured to direct a multi-component light beam along a first path through said coupling lens assembly to said prism assembly, wherein said first path is off-axis being offset laterally with respect to said optical axis of said coupling lens assembly.

16. The assembly of claim 15, and further comprising a ¼ wave plate.

17. The assembly of claim 16, wherein said ¼ wave plate is located between said prism assembly and said coupling lens assembly.

18. The assembly of claim 16, wherein said directing member comprises a polarized beam splitter cube, said polarized beam splitter cube being configured to direct said multi-component light along a first path through said ¼ wave plate and said coupling lens assembly and said prism assembly being configured to direct modulated light along said first path through said coupling lens assembly.

19. The assembly of claim 15, wherein said front face of said front prism is substantially normal to said first path.

20. The assembly of claim 15, and further comprising a display optics assembly in optical communication with said prism assembly.

21. The assembly of claim 15, wherein said directing member comprises a turning mirror, said turning mirror being configured to direct said multi-component light along a first path through said coupling lens assembly and said prism assembly being configured to direct modulated light along a second path through said coupling lens assembly, wherein said second path is offset from said optical axis of said coupling lens assembly in a direction different from said first path, wherein said optical axis of said coupling lens assembly is between said first and second paths.

22. A display system, comprising:
a light source module;
a projection assembly having a prism assembly that includes a first prism having a front face and a rear face, a second prism having a front face parallel to said rear face of said first prism, a side face, and a rear face, said second prism being configured to direct a first component beam through said side face, a third prism having a front face parallel to said rear face of said second prism, a side face, and a rear face, said third prism being configured to direct a second component beam through said side face, and a fourth prism having a front face parallel to said rear face of said third prism and a rear face, said rear face being parallel to said front face of said first prism, a first modulator panel in optical communication with said side face of said second prism, a second modulator panel in optical communication with said side face of said third prism; and a third modulator panel in optical communication with said rear face of said fourth prism, wherein said prism assembly comprises two independent optical paths including (1) a first path beginning at said first front face and through which incoming light is split and redirected to said three modulator panels by said prisms and (2) a second path in which light from said three modulator panels is combined and output through said first front face;

wherein said first and second optical paths are separated by an optical axis of said prism assembly; and an image processing unit coupled to said first, second, and third light modulator panels.

23. The system of claim 22, wherein said projection assembly is adapted for use in a rear projection television system.

24. The system of claim 22, wherein said projection assembly is adapted for use in a projector system.

25. A method of forming a prism assembly, comprising:
forming a first prism having first front and rear faces and internal angles of about 30, 60, and 90 degrees;
forming a second prism having second front, rear, and side faces and internal angles of approximately 40, 50 and 90 degrees;
forming a third prism having third front, rear and side faces and internal angles of about 30, 50, and 100 degrees;
forming a fourth prism having fourth front and rear faces; and
aligning said first, second, third and fourth prisms such that said first rear face is substantially parallel to said second front face, said second rear face is substantially parallel to said third front face, and said third rear face is substantially parallel to said fourth front face.

26. The method of claim 25, and further comprising forming a first dichroic surface between said second and third prisms and forming a second dichroic surface between said third and fourth prisms.

27. The method of claim 26, wherein forming said first dichroic surface includes forming a layer that reflects green light and transmits red/blue light and forming said second dichroic surface includes forming a layer that reflects blue light and transmits red light.

28. A method of modulating light, comprising:

directing multi-component light comprising multiple color components to a first prism of a prism assembly through a coupling lens assembly, wherein said light is directed along a first path offset laterally from an optical axis of said coupling lens assembly;

splitting said multi-component light into three color components with said prism assembly, wherein each color component is directed by said prism assembly to a different light modulator panel;

recombining said color components of light with said prism assembly after modulation; and directing said recombined light along a second path through said coupling lens assembly, said second path being offset laterally from said optical axis of said coupling lens assembly such that said optical axis of said coupling lens assembly is between said first and second paths.

* * * * *

UNITED STATES PATENT AND TRADEMARK OFFICE
CERTIFICATE OF CORRECTION

PATENT NO.        : 7,359,122 B2                                                Page 1 of 1
APPLICATION NO.   : 11/149739
DATED             : April 15, 2008
INVENTOR(S)       : James W. Ring et al.

It is certified that error appears in the above-identified patent and that said Letters Patent is hereby corrected as shown below:

In column 5, line 54, delete "liner" and insert -- linear --, therefor.

In column 5, line 54, delete "byte" and insert -- by the --, therefor.

In column 8, line 2, in Claim 1, after "face" delete "," and insert -- ; --, therefor.

In column 9, line 7, in Claim 11, after "through said" insert -- 1/4 --.

Signed and Sealed this

Twenty-third Day of September, 2008

JON W. DUDAS
*Director of the United States Patent and Trademark Office*